UNITED STATES PATENT OFFICE.

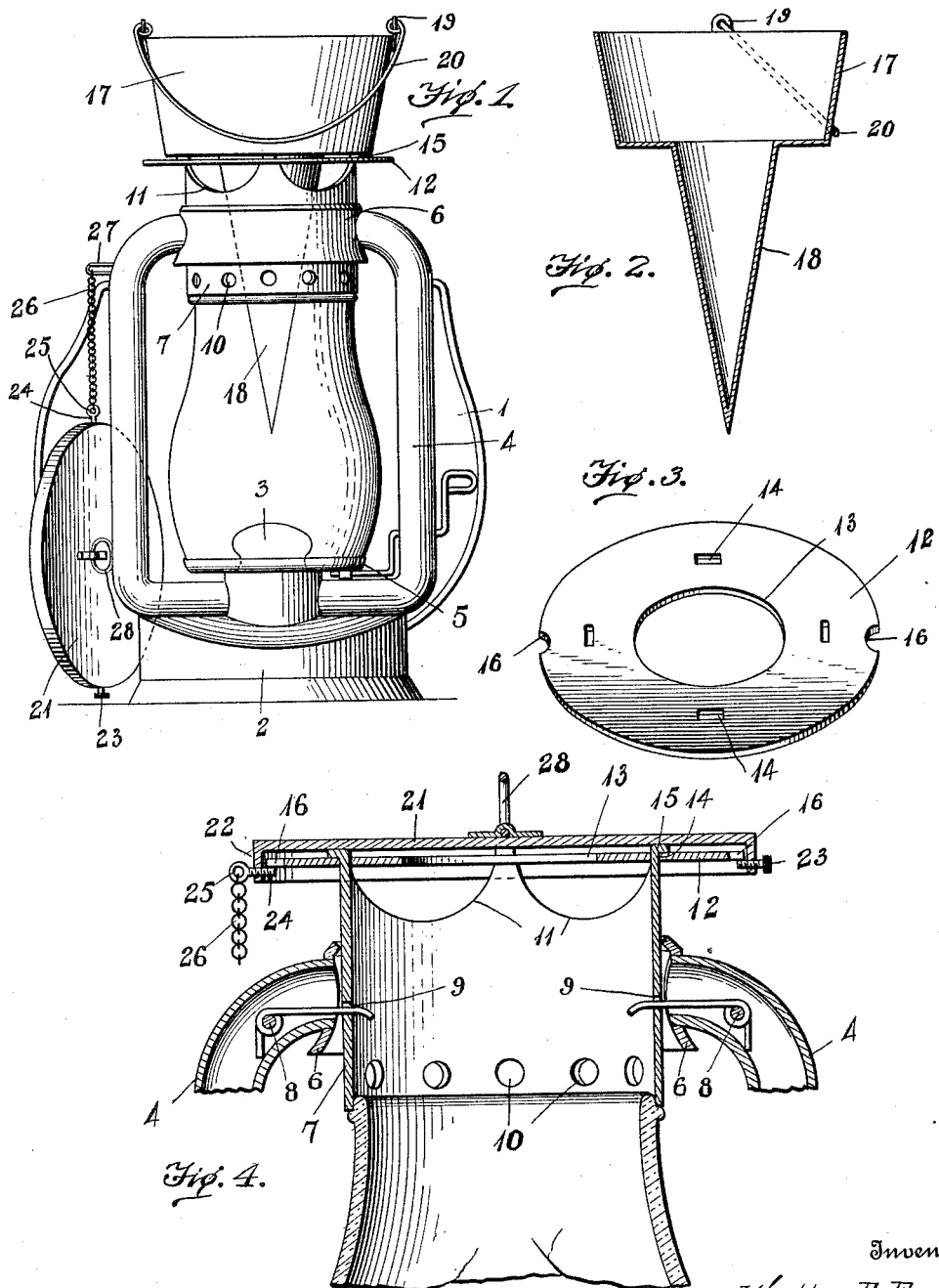

WALTER E. FROST, OF AUBURN, MAINE.

LANTERN.

1,071,151.  Specification of Letters Patent.  Patented Aug. 26, 1913.

Application filed November 21, 1912. Serial No. 732,707.

*To all whom it may concern:*

Be it known that I, WALTER E. FROST, a citizen of the United States, residing at Auburn, in the county of Androscoggin and State of Maine, have invented certain new and useful Improvements in Lanterns; and I do declare the following to be a full, clear, and exact description of the invention, such as will enable others skilled in the art to which it appertains to make and use the same.

This invention relates to improvements in lanterns.

One object of the invention is to provide a lantern having means whereby a receptacle or utensil may be applied thereto for the purpose of heating the contents of the receptacle and having means to cover the receptacle receiving opening in the top of the lamp when the receptacle is removed therefrom.

Another object is to provide a heating utensil for lanterns which is constructed to provide a maximum amount of heating surface when applied to the lantern.

With these and other objects in view, the invention consists of certain novel features of construction, and the combination and arrangement of parts as will be more fully described and claimed.

In the accompanying drawings; Figure 1 is a side view of a lantern showing the heating or cooking utensil arranged in operative position thereon; Fig. 2 is a vertical sectional view of the heating or cooking utensil; Fig. 3 is a detail perspective view of the utensil supporting top of the lantern; Fig. 4 is an enlarged sectional view of the upper end of the lantern and the utensil supporting plate showing the utensil removed and the removable top or cover of the lantern arranged in position thereon.

Referring more particularly to the drawing, 1 denotes my improved lantern, the oil font 2, burner 3, draft tubes 4 and globe supporting mechanism 5 which may be of the usual or any preferred construction and a description of these parts is not thought to be necessary.

The upper ends of the draft tubes 4 are connected with an annular draft flange 6 which is engaged with the globe supporting collar 7 of the lantern and to which the upper ends of the draft tubes are also connected by suitable springs 8 in the usual or any preferred manner. In the present instance the corresponding ends of the springs 8 are inserted through apertures 9 in the opposite sides of the collar whereby the latter is permitted to be lifted or raised a sufficient extent for disengaging the upper end of the globe when the latter is to be removed from or placed in position in the lantern. In the lower end of the collar are formed an annular series of ventilating apertures 10 while in the upper edge of the collar 7 are formed an annular series of ventilating notches 11.

Disposed across the upper end of the collar 7 is a utensil supporting plate 12 having therein a centrally disposed circular opening 13 and around it a set of slots 14 adapted to receive the tongues between the notches 11, in the upper end of the collar. Said tongues when inserted through the slots 14 in the plate 12 are upset or clenched into lugs 15 resting upon the upper side of the plate as clearly shown in Figs. 1 and 4 of the drawings. The lugs 15 aside from forming fastenings for the plate 12 also form supports or rests upon which the body of a cooking utensil may rest thereby having an air circulating space btween the bottom of the utensil and the supporting plate 12. In the edge of the plate 12 at diametrically opposite points are formed semi-circular notches 16 the purpose of which will be hereinafter described.

My improved utensil comprises a main body portion 17 which may be of any suitable shape and which is here shown and is preferably rounded, having its sides slightly tapered from the top to the bottom thereof. In the center of the bottom of the utensil is a downwardly projecting inverted cone shaped extension 18 which when the utensil is placed in position on the supporting plate 12 projects down through the opening 13 in said plate to a position immediately above the flame of the burner whereby the heat from said flame is applied directly to said extended portion of the bottom and the heating surface of the utensil thereby greatly increased. The utensil is preferably provided at its upper edge and at opposite points with apertured ears 19 to which are secured the ends of a bail shaped handle 20 whereby the utensil may be readily carried when removed from the lantern.

When the utensil is removed from the lantern the opening 13 in the supporting plate 12 is closed by a cover 21 comprising a plate corresponding in size and shape to the supporting plate 12 and having on its edge a downwardly extending annular flange 22 in which are formed threaded apertures to receive fastening screws 23 and 24. The fastening screw 23 is provided with a milled head while the screw 24 on the opposite side of the plate has its head in the form of an eye 25 to which is secured one end of a chain 26 the opposite end of which is secured to a staple 27 or other connection on one of the draft tubes 4 or other suitable part of the lantern. The screws 23 and 24 are set to project inwardly a sufficient distance to engage the edge of the supporting plate 12. The cover is applied by turning it until the screws register with the notches 16 in the supporting plate, thus permitting the inner ends of the screws to pass the plate when the cover is let down thereon, after which the cover may be turned slightly in either direction to bring the ends of the screws out of alinement with the notches thereby locking the cover in position on the upper end of the lantern without necessitating the manipulation of the screws each time the cover is placed on or removed from the lantern.

Secured to the center of the upper side of the cover 21 is a ring 28 by means of which the cover may be conveniently handled in placing the same upon and removing it from the lantern. When the cover plate is placed in position on the lantern said plate will rest on the lugs 15 and will be thereby held a slight distance above the supporting plate 12 to form between said plate and the cover an air circulating space.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my invention, what I claim is:—

A lantern having on its upper end a collar provided in its upper edge with a series of notches and lugs between them, a plate secured to the notched upper edge of said collar, said plate having a central opening, slots around it engaged by said lugs, and notches in its edges, a cover plate having a depending annular flange, fastening screws in the flange adapted to pass through said notches when the cover is applied to the plate and to be turned out of engagement with the notches for fastening the cover on the plate, and a flexible connection attached at one end to one of said screws and at its opposite end to the lantern frame.

In testimony whereof I have hereunto set my hand in presence of two subscribing witnesses.

WALTER E. FROST.

Witnesses:
EDWARD F. KENNEY,
R. J. STAPLES.